(12) United States Patent
Cheng et al.

(10) Patent No.: US 10,416,486 B2
(45) Date of Patent: Sep. 17, 2019

(54) BACKLIGHT MODULE AND DISPLAY DEVICE

(71) Applicant: Wuhan China Star Optoelectronics Technology Co., Ltd., Wuhan, Hubei (CN)

(72) Inventors: Yan Cheng, Guangdong (CN); Gege Zhou, Guangdong (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/024,071

(22) Filed: Jun. 29, 2018

(65) Prior Publication Data

US 2019/0064428 A1 Feb. 28, 2019

Related U.S. Application Data

(63) Continuation of application No. PCT/CN2018/076345, filed on Feb. 11, 2018.

(30) Foreign Application Priority Data

Aug. 26, 2017 (CN) .......................... 2017 1 0745945

(51) Int. Cl.
  *G02F 1/1333* (2006.01)
  *G02F 1/1335* (2006.01)

(52) U.S. Cl.
  CPC .. *G02F 1/133308* (2013.01); *G02F 1/133615* (2013.01); *G02F 1/133528* (2013.01);
  (Continued)

(58) Field of Classification Search
  None
  See application file for complete search history.

(56) References Cited

U.S. PATENT DOCUMENTS

2018/0146956 A1* 5/2018 Imai .......................... A61B 8/14

FOREIGN PATENT DOCUMENTS

CN 203324616 U 12/2013
CN 203868845 U 10/2014
(Continued)

OTHER PUBLICATIONS

Translation of CN205581451 Mar. 2019 (Year: 2019).*

*Primary Examiner* — Phu Vu
(74) *Attorney, Agent, or Firm* — Leong C. Lei

(57) ABSTRACT

A backlight module and display device is disclosed. The backlight module includes a light-shielding adhesive, a plastic frame, a reflective sheet, a light guide plate and an optical film. Wherein the reflective sheet, the light guide plate and the optical film are sequentially stacked, the plastic frame surrounds the reflective sheet, the light guide plate and the optical film; the light-shielding adhesive includes a first section and a second section connected with the first section, the first section is a double-sided adhesive, and the second section is a single-side adhesive, the first section is adhered to the plastic frame and the reflective sheet; one portion of the second section is adhered to an end surface of the plastic frame, the other portion of the second section is extended out from the backlight module. Accordingly, the present invention can realize a narrow-frame backlight module.

8 Claims, 2 Drawing Sheets

(52) U.S. Cl.
    CPC ............ *G02F 2001/133314* (2013.01); *G02F 2202/28* (2013.01)

(56) References Cited

FOREIGN PATENT DOCUMENTS

| | | |
|---|---|---|
| CN | 204116762 U | 1/2015 |
| CN | 204405997 U | 6/2015 |
| CN | 204989708 U | 1/2016 |
| CN | 105866994 A | 8/2016 |
| CN | 205485160 U | 8/2016 |
| CN | 205581451 U | 9/2016 |
| CN | 205643961 U | 10/2016 |
| CN | 106647029 A | 5/2017 |
| CN | 107340643 A | 11/2017 |
| JP | 2005243572 A | 9/2005 |

\* cited by examiner

BACKLIGHT MODULE AND DISPLAY DEVICE

CROSS REFERENCE

This application is a continuing application of PCT Patent Application No. PCT/CN2018/076345, entitled "BACKLIGHT MODULE AM) DISPLAY DEVICE", filed on Feb. 11, 2018, which claims priority to China Patent Application No. CN 201710745945.X filed on Aug. 26, 2017, both of which are hereby incorporated in its entireties by reference.

FIELD OF THE INVENTION

The present invention relates to a display technology field, and more particularly to a backlight module and a display device.

BACKGROUND OF THE INVENTION

Along with the rapid development of the liquid crystal display technology and increasing requirement of the display device for users, an electric product having a narrow frame display effect has been more and more favorite by users, specifically, the television, computer, and mobile display products.

Currently, for a liquid crystal display technology using a backlight, a narrow frame will increase a light leakage risk at the edge. Therefore, an adhesive dispensing process is added in the narrow frame process to effectively fix each element in order to prevent an edge of the display device from leaking a light in order to increase a display effect of an image of the display device. However, a thickness of the liquid adhesive in the adhesive dispensing process cannot be precisely controlled, which will seriously affect the technology effect of the narrow frame.

SUMMARY OF THE INVENTION

The purpose of the present invention is to provide a narrow-frame backlight module.

The present invention provides a backlight module, comprising: a light-shielding adhesive, a plastic frame, a reflective sheet, a light guide plate and an optical film; wherein the reflective sheet, the light guide plate and the optical film are sequentially stacked; the plastic frame surrounds the reflective sheet, the light guide plate and the optical film; the light-shielding adhesive includes a first section and a second section connected with the first section; the first section is a double-sided adhesive, and the second section is a single-side adhesive; the first section is adhered to the plastic frame and the reflective sheet; one portion of the second section is adhered to an end surface of the plastic frame, the other portion of the second section is extended out from the backlight module.

Wherein the plastic frame includes a side wall, a surface adhering to the reflective sheet is a bottom surface of the side wall, the first section of the light-shielding adhesive is adhered to the bottom surface of the side gall and a surface of the reflective sheet.

Wherein the light-shielding adhesive includes a base substrate and an adhesive agent disposed on a surface of the base substrate.

Wherein the adhesive agent extended out from the backlight module is located at a side of the second section faced toward the light guide plate.

Wherein the base substrate is a flexible material.

The present invention also provides with a display device, comprising: a backlight module and a liquid crystal panel, wherein the liquid crystal panel is stacked on the backlight module; wherein, the backlight module includes a light-shielding adhesive, a plastic frame, a reflective sheet, a light guide plate and an optical film, wherein the reflective sheet, the light guide plate and the optical film are sequentially stacked; the plastic frame surrounds the reflective sheet, the light guide plate and the optical film; the light-shielding adhesive includes a first section and a second section connected with the first section; the first section is a double-sided adhesive, and the second section is a single-side adhesive; the first section is adhered to the plastic frame and the reflective sheet; one portion of the second section is adhered to an end surface of the plastic frame, the other portion of the second section is extended out from the backlight module, and is adhered to an end surface of the liquid crystal panel.

Wherein the plastic frame includes a side wall, a surface adhering to the reflective sheet is a bottom surface of the side wall, the first section of the light-shielding adhesive is adhered to the bottom surface of the side wall and a surface of the reflective sheet; one portion of the second section is adhered to an end surface of the side wall, the other portion of the second section is extended out from the backlight module, and is adhered to an end surface of the liquid crystal panel located as a same plane of the end surface of the side wall.

Wherein the light-shielding adhesive includes a base substrate and an adhesive agent disposed on a surface of the base substrate.

Wherein the base substrate is a flexible material.

Wherein the liquid crystal panel includes a lower polarizer, a thin-film transistor array substrate, a color filter substrate and an upper polarizer sequentially stacked on the backlight module.

The beneficial effects of the present invention are as follows: the light-shielding adhesive includes a first section and a second section connected with the first section. The first section is a double-side adhesive, and the second section is a single-side adhesive. The first section bonds the plastic frame and the reflective sheet. The second section is adhered to an end surface of the plastic frame and extended out from the backlight module so that the liquid crystal panel and the plastic frame are fixed and adhered. The light-shielding adhesive can reduce the adhesive dispensing process, have a light-shielding effect at end surfaces of the liquid crystal panels and the plastic frames, ensure the thickness of the adhesive, and realize a narrow-frame technology effect.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present. For the person of ordinary skill in the art without creative effort, it can also obtain other figures according to these figures.

DETAILED DESCRIPTION OF THE PREFERRED EMBODIMENT

Figure 1:
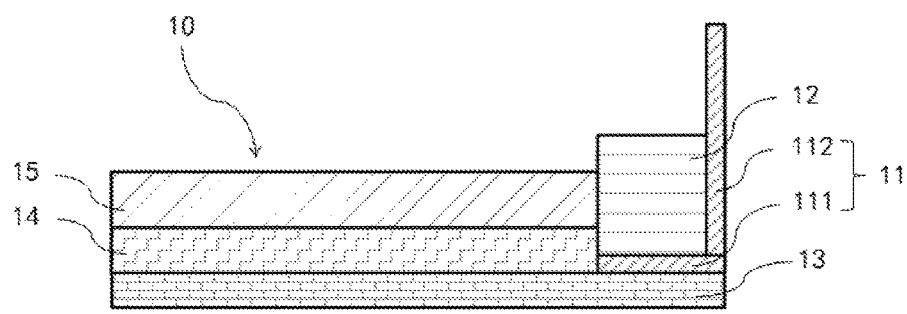
FIG. 1 is a cross-sectional view of a backlight module of the present invention.

With reference to FIG. 1, which is a cross-sectional view of a backlight module of the present invention. The embodiment of the present invention provides a backlight module 10, and the backlight module 10 includes a light-shielding adhesive 11, a plastic frame 12, a reflective sheet 13, a light guide plate 14 and an optical film 15. The reflective sheet 13, the light guide plate 14 and the optical film 15 are sequentially stacked. The plastic frame 12 surrounds the reflective sheet 13, the light guide plate 14 and the optical film 15. The light-shielding adhesive 11 includes a first section 111 and a second section 112 connected with the first section 111. The first section 111 is a double-sided adhesive, and the second section 112 is a single-side adhesive.

Figure 2:
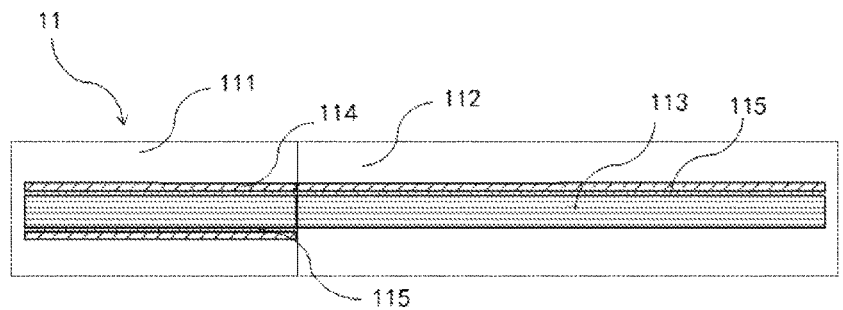
FIG. 2 is a schematic diagram of a light-shielding adhesive of the backlight module shown in FIG. 1.

Furthermore, as shown in FIG. 2, the light-shielding adhesive 11 includes a base substrate 113 and an adhesive agent 115 disposed on a surface of the base substrate 113. Before the light-shielding adhesive 11 is used, a release film 114 is provided to cover the adhesive agent 115. The base substrate 113 is a flexible material, and is foldable at any directions. The first section 111 includes the base substrate 113 and the adhesive agent 115 disposed at two outer side surfaces of the base substrate 113. The second section 112 includes the adhesive agent 115 disposed at one surface of the base substrate 113. Specifically, the base substrate 113 has a first surface and a second surface disposed oppositely to the first surface. For the base substrate 113 of the double-side adhesive the adhesive agent 115 is disposed at both of the first surface and the second surface. In order to avoid the adhesive agent 115 disposed at the surface of the base substrate 113 from losing viscosity because of an external destruction, a surface of the adhesive agent 115 is disposed with the release film 114. For a single-side adhesive, the first surface of the base substrate 113 is disposed with the adhesive agent 115, and covering with the release film 114 on the surface of the adhesive agent 115. When a user applies the light-shielding adhesive 11, tearing off the release film 114 of the light-shielding adhesive 11, and adhering to the backlight module 10.

In the present embodiment, the plastic frame 12 includes a side wall 121. A surface of the plastic frame 12 adhering to the reflective sheet 13 is a bottom surface of the side wall 121. The first section 111 of the light-shielding adhesive 11 is adhered to the bottom surface of the side wall 121 and a surface of the reflective sheet 13. In an assembly process of the backlight module 10, using the double-side adhesive to adhere the plastic frame 12 to the reflective sheet 13 such that the reflective sheet 13 and the light guide plate 14 can effectively combine with the plastic frame 12. Specifically, the release film 114 of the second section 112 is disposed upwardly, tearing the release film 114 at two opposite outer surfaces of the first section 111. Adhering the adhesive agent 115 at the first surface of the first section 111 to the bottom surface of the plastic frame 12, and adhering the adhesive agent 115 at the second surface of the first section 111 to the surface of the reflective sheet 13.

After the backlight module is assembled, one portion of the single-side adhesive is adhered to an end surface of the plastic frame 12, another portion of the single-side adhesive is extended out from the backlight module 10 in order to avoid a light leakage. Specifically, the second section 112 connected with the first section 111 is a single-side adhesive. Tearing off the release film 114, folding up the light-shielding adhesive 11 along the side wall 121 of the plastic frame 12 such that the one portion of the first surface of the second section 112 of the light-shielding adhesive 11 is adhered to an end surface of the plastic frame 12, another portion of the first surface of the second section 112 of the light-shielding adhesive 11 is extended out from the backlight module 10. The adhesive agent 115 extended out from the backlight module 10 is located at a side of the second section 112 faced toward the light guide plate 14. The light-shielding adhesive 11 of the present invention not only can avoid the light leakage, but also prevent the conventional art that adopting an adhesive dispensing method so that the adhesive liquid penetrates the backlight module 10 and the liquid crystal panel 20 to cause a high failure rate. More important, when using the light-shielding adhesive 11, the thickness of the light-shielding adhesive 11 can be strictly controlled to realize a narrow-frame effect, avoid uncontrollable thickness of the liquid adhesive in the adhesive dispensing method of the conventional art.

Figure 3:
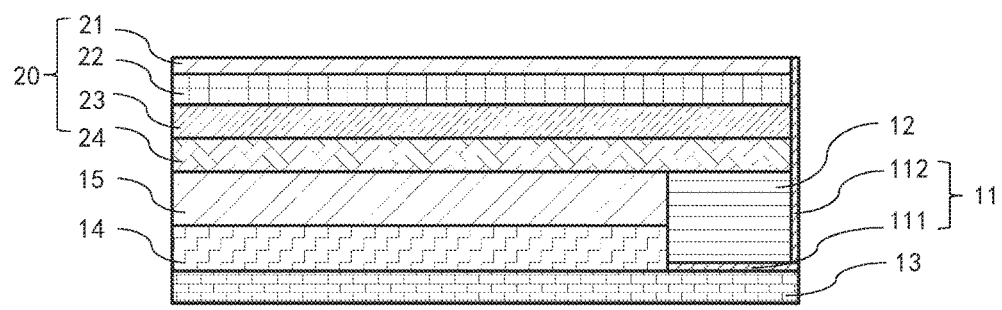
FIG. 3 is a cross-sectional view of a display device of the present invention.

With reference to FIG. 3, the embodiment of the present invention provides a display device. The device includes a backlight module 10 and a liquid crystal panel 20. Specifically, the liquid crystal panel includes an upper polarizer 21, a color filter substrate 22, a thin-film transistor array substrate 23, and a lower polarizer 24. The lower polarizer 24, the thin-film transistor array substrate 23, the color filter substrate 22 and the upper polarizer 21 are sequentially stacked on the backlight module 10. In the present embodiment, the plastic frame 12, the reflective sheet 13, the light guide plate 14, the optical film 15, the upper polarizer 21, the color filter substrate 22, the thin-film transistor 23 and the lower polarizer 24 are connected through a bonding method. Of course, in another embodiment, a magnetic attraction or a vacuum adsorption can also be adopted.

In the present embodiment, the first section 111 of the light-shielding adhesive 11 is adhered to the bottom surface of the side wall 121 and the surface of the reflective sheet 13. One portion of the second section 112 of the light-shielding adhesive 11 is adhered to an end surface of the plastic frame 11, and the other portion of the second section 112 of the light-shielding adhesive 11 is extended out form the backlight module and adhered to an end surface of the liquid crystal panel 20. Specifically, the second section 112 connected with the first section 111 is a single-side adhesive. Tearing off the release film 114. Because the adhesive agent 115 extended out from the backlight module 10 is located at a side of the second section 112 faced toward the light guide plate 114 such that the first surface of the light-shielding adhesive 11 can be folded up along the side wall 121 of the plastic frame 12 such that the one portion of the first surface of the second section 112 of the light-shielding adhesive 11 is adhered to an end surface of the plastic frame 12, another portion of the first surface of the second section 112 of the light-shielding adhesive 11 is extended out from the backlight module 10. The first surface of the light-shielding 11 is adhered to an end surface of the liquid crystal panel located as a same plane of the end surface of the side wall. Because the light-shielding adhesive 11 block the gap between the backlight module 10 and the liquid crystal panel 20, and blocks a direct contact between the backlight module 10, the liquid crystal panel 20 and an external environment so that a light leakage of the backlight module 10 and the liquid crystal panel 2 is prevented.

Accordingly, the backlight module and the display device of the embodiment of the present invention, through designing a light-shielding adhesive, the light-shielding adhesive 11 includes a first section 111 and a second section 112 connected with the first section 111. The first section 111 is a double-side adhesive, and the second section 112 is a single-side adhesive. The double-side adhesive bonds the plastic frame 12 and the reflective sheet 13. One portion of the single-side adhesive is adhered to an end surface of the plastic frame 12, and the other portion of the single-side adhesive is extended out from the backlight module 10, and adhered to an end surface of the liquid crystal panel 20. The light-shielding adhesive can perform a double-side bonding at the reflective sheet 13 and the plastic frame 12, and perform a single-side bonding at the end surfaces of the backlight module 10 and the liquid crystal panel 20 in order to have a light-shielding effect. Besides, the adhesive dispensing process can be reduced in order to realize a narrow-frame technology effect, use a simple adhering process to reduce the cost, save time and decrease failure rate of the image of the display device.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A backlight module, comprising:
   a light-shielding adhesive, a plastic frame, a reflective sheet, a light guide plate and an optical film;
   wherein the reflective sheet, the light guide plate and the optical film are sequentially stacked; the plastic frame surrounds the reflective sheet, the light guide plate and the optical film; the light-shielding adhesive includes a first section and a second section connected with the first section; the first section is a double-sided adhesive, and the second section is a single-side adhesive; the first section is adhered to the plastic frame and the reflective sheet; one portion of the second section is adhered to an end surface of the plastic frame, and the other portion of the second section is extended out from the backlight module;
   wherein the light-shielding adhesive comprises a base substrate having a first part and a second part respectively corresponding to the first section and the second section of the light-shielding adhesive, the base substrate having a constant thickness through the first part and the second part, the base substrate having a first surface and an opposite second surface, wherein the first surface of the second part of the base substrate is coated with an adhesive agent to form the single-side adhesive of the second section of the light-shielding adhesive, and the first and second surfaces of the first part of the base substrate are both coated with the adhesive agent to form the double-sided adhesive of the first section of the light-shielding adhesive; and
   wherein the double-sided adhesive of the first section of the light-shielding adhesive is sandwiched between the plastic frame and the reflective sheet and adhered to the plastic frame and the reflective sheet with the adhesive agent on the first and second surfaces of the first part of the base substrate of the light-shielding adhesive.

2. The backlight module according to claim 1, wherein the plastic frame includes a side wall, of which a surface attached to the reflective sheet is a bottom surface of the side wall, wherein the first and second surfaces of the first section of the light-shielding adhesive are adhered to the bottom surface of the side wall of the plastic frame and a surface of the reflective sheet, respectively.

3. The backlight module according to claim 1, wherein the adhesive agent that is disposed on the other portion of the second section that is extended out from the backlight module is located at a side of the second section facing toward the light guide plate.

4. The backlight module according to claim 1, wherein the base substrate is a flexible material.

5. A display device, comprising:
   a backlight module and a liquid crystal panel, wherein the liquid crystal panel is stacked on the backlight module;
   wherein the backlight module includes a light-shielding adhesive, a plastic frame, a reflective sheet, a light guide plate and an optical film, wherein the reflective sheet, the light guide plate and the optical film are sequentially stacked; the plastic frame surrounds the reflective sheet, the light guide plate and the optical film; the light-shielding adhesive includes a first section and a second section connected with the first section; the first section is a double-sided adhesive, and the second section is a single-side adhesive; the first section is adhered to the plastic frame and the reflective sheet; one portion of the second section is adhered to an end surface of the plastic frame, and the other portion of the second section is extended out from the backlight module and is adhered to an end surface of the liquid crystal panel;
   wherein the light-shielding adhesive comprises a base substrate having a first part and a second part respectively corresponding to the first section and the second section of the light-shielding adhesive, the base substrate having a constant thickness through the first part and the second part, the base substrate having a first surface and an opposite second surface, wherein the first surface of the second part of the base substrate is coated with an adhesive agent to form the single-side adhesive of the second section of the light-shielding adhesive, and the first and second surfaces of the first part of the base substrate are both coated with the adhesive agent to form the double-sided adhesive of the first section of the light-shielding adhesive; and
   wherein the double-sided adhesive of the first section of the light-shielding adhesive is sandwiched between the plastic frame and the reflective sheet and adhered to the plastic frame and the reflective sheet with the adhesive agent on the first and second surfaces of the first part of the base substrate of the light-shielding adhesive.

6. The display device according to claim 5, wherein the plastic frame includes a side wall, of which a surface attached to the reflective sheet is a bottom surface of the side wall, wherein the first and second surfaces of the first section of the light-shielding adhesive are adhered to the bottom surface of the side wall of the plastic frame and a surface of the reflective sheet, respectively; the one portion of the second section is adhered to an end surface of the side wall of the plastic frame, and the other portion of the second section that is extended out from the backlight module is adhered to the end surface of the liquid crystal panel that is located on a same plane of the end surface of the side wall of the plastic frame.

7. The display device according to claim 5, wherein the base substrate is a flexible material.

8. The display device according to claim 5, wherein the liquid crystal panel includes a lower polarizer, a thin-film transistor array substrate, a color filter substrate and an upper polarizer sequentially stacked on the backlight module.

* * * * *